(12) United States Patent
Hoffman

(10) Patent No.: US 6,574,909 B1
(45) Date of Patent: Jun. 10, 2003

(54) FISHING LURE

(75) Inventor: Ken Hoffman, Anderson, SC (US)

(73) Assignee: H & H Industries, Anderson, SC (US)

( * ) Notice: Subject to any disclaimer, the term of this patent is extended or adjusted under 35 U.S.C. 154(b) by 0 days.

(21) Appl. No.: 10/103,245

(22) Filed: Mar. 21, 2002

(51) Int. Cl.$^7$ ............................................. A01K 91/00
(52) U.S. Cl. ................................................... 43/42.35
(58) Field of Search ..................... 43/42.35, 42.31, 43/42.11, 42.15, 42.1

(56) References Cited

U.S. PATENT DOCUMENTS

| | | | | |
|---|---|---|---|---|
| 671,613 A | * | 4/1901 | Locher et al. | 43/42.14 |
| 1,315,408 A | * | 9/1919 | Rabbeth | 43/42.05 |
| 1,522,185 A | * | 1/1925 | Hawes | 43/42.16 |
| 1,873,289 A | * | 8/1932 | Clark | 43/42.15 |
| 2,644,265 A | * | 7/1953 | Stettner | 43/42.06 |
| 2,645,875 A | * | 7/1953 | Chase | 43/42.18 |
| 2,659,176 A | * | 11/1953 | Wenger | 43/42.31 |
| 2,718,725 A | * | 9/1955 | Thurman | 43/42.31 |
| 2,835,999 A | | 5/1958 | Gillilan | 43/26.2 |
| 2,891,343 A | * | 6/1959 | Palmero | 43/26.2 |
| 3,313,059 A | * | 4/1967 | Jures | 43/42.16 |
| 3,550,304 A | | 12/1970 | Kuslich | 43/42.15 |
| 3,896,580 A | * | 7/1975 | Williams, Jr. | 43/42.06 |
| 4,037,345 A | * | 7/1977 | Dubois | 43/42.13 |
| 4,447,981 A | | 5/1984 | Bauer | 43/42.21 |
| 5,024,019 A | * | 6/1991 | Rust et al. | 43/42.11 |
| 5,201,784 A | * | 4/1993 | McWilliams | 43/42.11 |
| 5,276,992 A | * | 1/1994 | Kato | 43/42.06 |
| 5,992,084 A | * | 11/1999 | Kitagawa | 43/42.22 |
| 6,158,162 A | * | 12/2000 | Loniello | 43/42.11 |
| 6,182,390 B1 | * | 2/2001 | Watkins | 43/42.11 |

* cited by examiner

*Primary Examiner*—Charles T. Jordan
*Assistant Examiner*—Jordan M Lofdahl
(74) *Attorney, Agent, or Firm*—Charles L. Schwab; Nexsen Pruet Jacobs & Pollard, LLC

(57) ABSTRACT

A buoyant fishing lure having a relatively long narrow body with a rotating tail fin. The lure assumes a vertical position when it is stationary in the water. When drawn through the water the lure sounds and looks sufficiently like a live bait that a game fish will strike without hesitation.

2 Claims, 1 Drawing Sheet

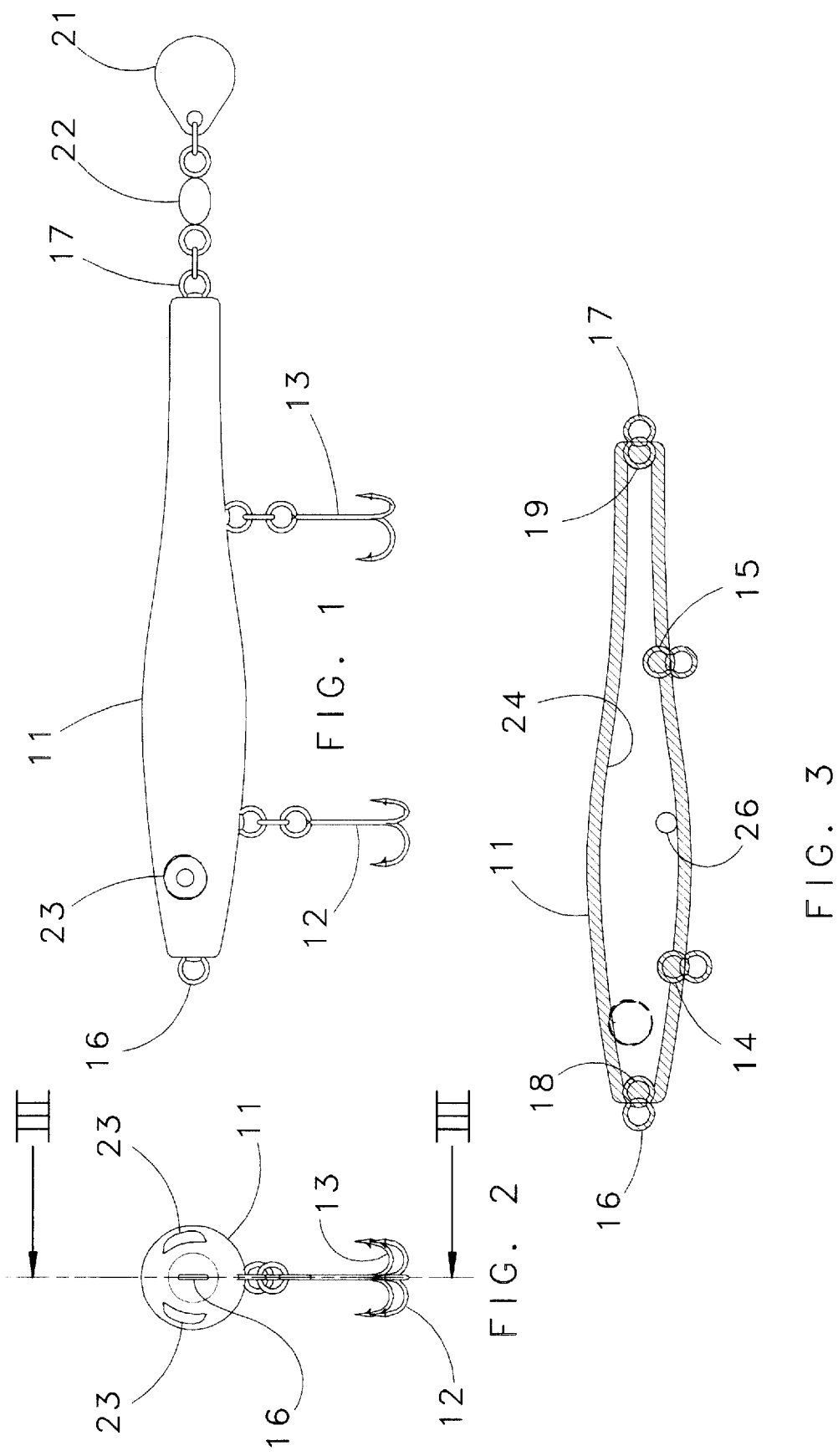

FISHING LURE

TECHNICAL FIELD

This invention relates to a fishing lure having a body in the general shape of a minnow and a tail which moves relative to the body when it is drawn through the water.

BACKGROUND OF THE INVENTION

There are many different lures being sold for fishing which, for marketing purposes, are claimed to be attractive to a wide variety of fish.

The lure disclosed in U.S. Pat. No. 2,835,999, issued to E. S. Gillilan for a Revolving Fish Lure, has a body made up of two sections with fins causing the sections to rotate in opposite directions. A hook is pivotally connected to each section of the body and thus the hooks rotate in a spiral fashion as the lure is drawn through the water. A flexible finger on the rear section of the lure body strikes a pin on the tail of the lure during each rotation, causing the tail to vibrate.

U.S. Pat. No. 3,550,304 issued Dec. 29, 1970 to J. S. Kuslich for a Fishing Lure shows a trolling lure having a bifurcated tail. The tail is made up of a pair of spoon shaped components which diverge from one another in a rearward direction.

U.S. Pat. No. 4,447,981 issued May 15, 1984 to P. E. Bauer for a Level-Traveling Fishing Lure discloses a forward weighted fishing lure having a spinner between the body of the lure and a trailing hook connected to the shaft on which the spinner rotates.

OBJECT AND SUMMARY OF THE INVENTION

It is a primary object of this invention to provide a fishing lure particularly suited to casting which has the appearance and action in water to cause a fish to strike the lure without hesitation.

It is a further object of the invention to provide a fishing lure which can be economically manufactured and gives long, trouble-free service.

BRIEF DESCRIPTION OF THE DRAWINGS

A preferred embodiment of the fishing lure of this invention is illustrated in the accompanying drawings in which:

FIG. 1 is a side view of a lure

FIG. 2 is a front view of the lure shown in FIG. 1 and

FIG. 3 is a section taken on the line III—III in FIG. 2 omitting the hooks and spinner tail.

DETAILED DESCRIPTION OF THE INVENTION

Referring to the drawings, the preferred embodiment of the fishing lure includes an elongated body 11 in the shape of a thin bodied minnow. The body 11 may be made of a suitable plastic. A pair of hooks 12, 13 are fastened by rings 14, 15 molded into the underside of the lure body 11. Eyelets 16 and 17 are provided on the blunt front and rear ends of the body 11. An oval shaped tail fin 21 is fastened to the rear eyelet 16 by a ball joint type connector 22 which permits the tail fin 21 to spin. The front eyelet is 16 designed for connection to a fishing line. An artificial three dimension eye 23 is secured to each side of the front of the body 11 of the lure to add to its minnow-like appearance. The lure body 11 is hollow to provide an elongated cavity 24 extending from the front end to the rear end and a ball shaped weight 26 may be provided which is free to roll fore and aft as the lure is jerked through the water when engaged in casting type fishing. The lure will float in the water. When the lure is not being moved in the water it will assume a vertical position with its tail fin 21 down.

The lure emits a fish feeding sound as it is pulled through the water with short jerking motions, calling fish to feed on the lure in a competitive manner. The lure emits splashing and bubble trails. The revolving spinner tail fin 21 emits a vibrating, fish feeding sound as it turns and flutters in the water simulating the feeding reaction of game fish. The lure assumes a vertical position when it is not moving in the water and when the lure is jerked the water is disturbed creating a sound similar to a minnow trying to escape a charging game fish. The hooks 12, 13 and the spinner tail fin 21 act as a rudder and cause the lure to track straight as it is pulled through the water.

The weight of the spinner tail fin 21 and rear hook 13 may be sufficient to cause the lure to assume a vertical position when stationary in the water. The roller ball 26 acts as a rattle and transfers weight during casting. When the lure is stationary in the water, the ball rolls to the rear to help place the lure in a vertical position.

When the lure is drawn through the water, as when casting, the spinning tail gives the lure the appearance of a swimming minnow. It will be noted that this lure does not have any other fins than the tail fin 21. Omitting use of protruding side, back and underside fins is believed to cause the game fish to strike the lure with less hesitation. The lure of this invention when pulled through the water actually looks and sounds more like a minnow to a game fish than a lure with additional protruding fins.

What is claimed is:

1. A buoyant fishing lure comprising:
   an elongated slender body with a smooth exterior free of protruding fins, and having
      an underside,
      a front end,
      a rear end and
      an elongated interior cavity extending between said front end and said rear end,
   at least one hook secured to and depending from the underside of said body,
   an eyelet connected to said front end of said body adapted for connection to a fishing line,
   an oval shaped tail fin,
   a rotary connection between said tail fin and said rear end of said body permitting said tail fin to rotate in a spinning fashion as said lure is drawn through the water and
   a roller ball disposed in said interior cavity of said body,
   said interior cavity permitting straight line linear fore and aft movement of said ball in said cavity,
   said lure body being weighted to assume a vertical front end up position when it is stationary in the water and said lure remaining on the surface of the water when drawn in the water.

2. The fishing lure as set forth in claim 1 having a pair of three dimension eyes on opposite sides, respectively, of said front end of said body.

* * * * *